United States Patent [19]

Dehnert

[11] 4,217,006
[45] Aug. 12, 1980

[54] DRIVE BELT ASSEMBLY FOR SNOWMOBILES

[75] Inventor: Douglas K. Dehnert, St. Hilaire, Minn.

[73] Assignee: Arctic Enterprises, Inc., Thief River Falls, Minn.

[21] Appl. No.: 934,514

[22] Filed: Aug. 17, 1978

[51] Int. Cl.² .............................................. B62D 55/24
[52] U.S. Cl. .................................. 305/35 EB; 305/38; 305/56
[58] Field of Search ................. 305/35 EB, 38, 56, 24, 305/25; 180/9.62

[56] References Cited

U.S. PATENT DOCUMENTS

| 3,887,243 | 6/1975 | Chaumont | 305/35 EB X |
| 4,023,865 | 5/1977 | Morissette | 305/35 EB |

*Primary Examiner*—David A. Scherbel
*Attorney, Agent, or Firm*—Allegretti, Newitt, Witcoff & McAndrews

[57] ABSTRACT

A track or drive belt assembly primarily for use with snowmobiles. The drive belt assembly includes a unitarily formed, continuous or endless, flexible drive belt having an inner side and an outer ground engaging side. The unitary drive belt assembly includes a central endless section and a pair of laterally spaced endless side sections. A plurality of longitudinally spaced members unitarily interconnect the side sections to the central belt section. A plurality of unitary drive lugs project inwardly from the inner side of each of the belt sections and selected lugs are located proximate to the unitary interconnecting members. A plurality of rigid members are connected to the drive belt. Each rigid member has a first section that is fixed to the one interconnecting member and a second or offset section which is in supporting and cooperative relationship with each of the selected lug members. The lug members and rigid metal members cooperate to guide the movement of the drive belt relative to the slide rail suspension system, commonly used on snowmobiles.

2 Claims, 6 Drawing Figures

U.S. Patent   Aug. 12, 1980   Sheet 2 of 2   4,217,006
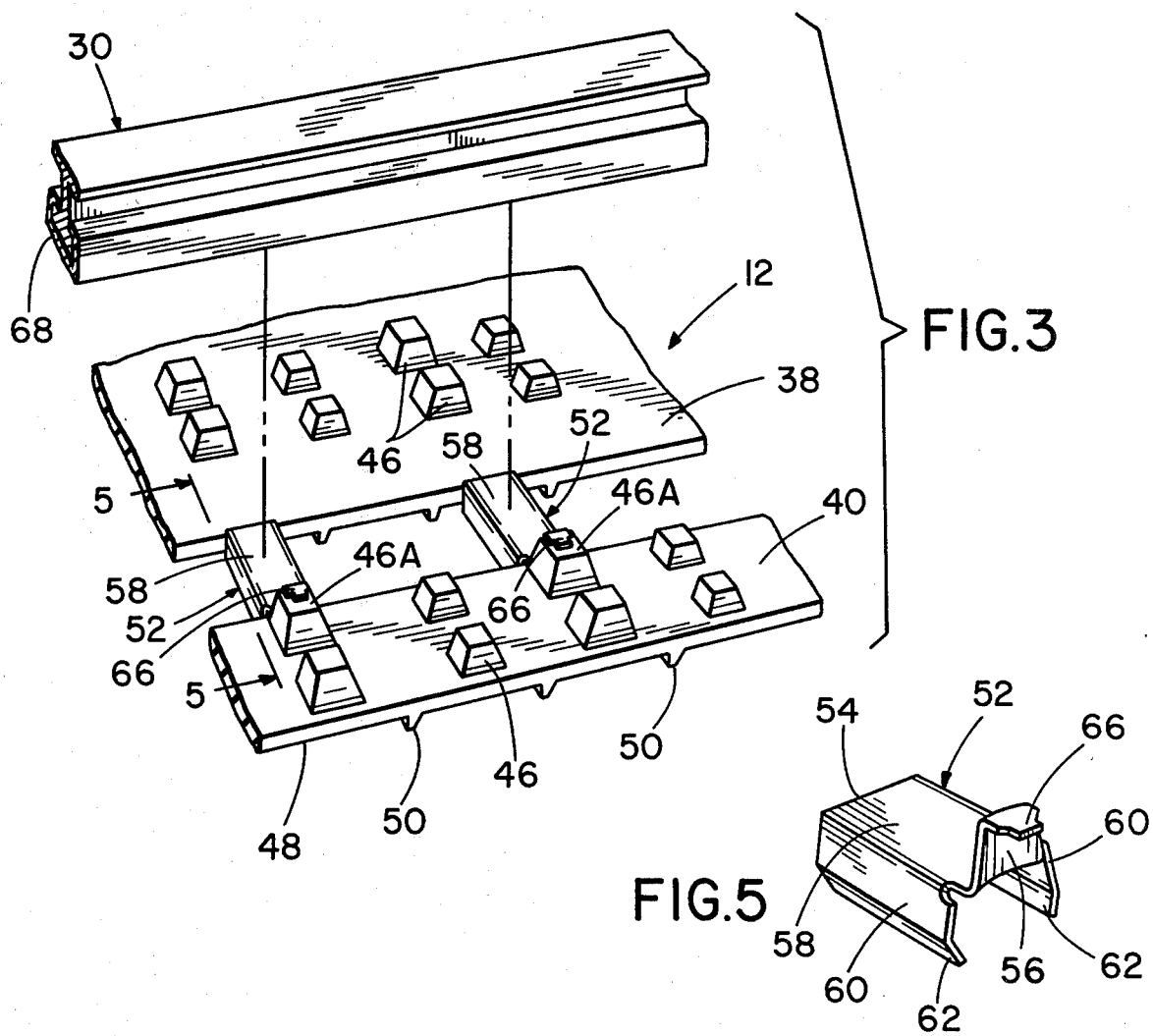
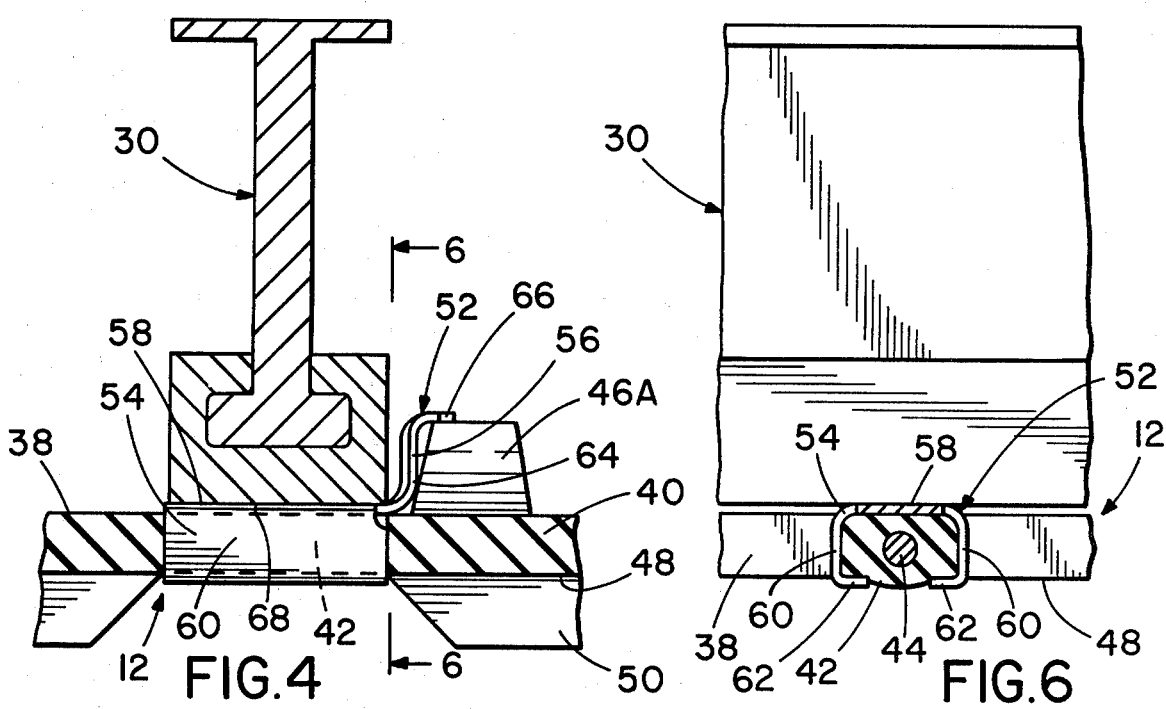

4,217,006

DRIVE BELT ASSEMBLY FOR SNOWMOBILES

BACKGROUND OF THE INVENTION

Field of the Invention and Description of the Prior Art

This invention relates to an improved drive belt or track assembly particularly useful for snowmobiles and it particularly relates to an improvement in a unitarily formed drive belt assembly having rigid guide clips for guiding the movement of the drive belt relative to a slide rail type of suspension system commonly used with snowmobiles.

Continuous or endless drive belts or tracks are used in connection with snowmobiles for engaging the ground, snow or ice in order to propel the snowmobile forwardly. Generally speaking, the drive belt or track for a snowmobile has a width substantially equal to the seat portion and is drivably suspended on the frame of the snowmobile. A drive track is generally positioned on the rear portion of the snowmobile and a pair of steerable skis support the front end of the snowmobile. One type of snowmobile drive belt design is shown, for example, in the Kell U.S. Pat. No. 3,623,780. Such drive belts are made in three continuous sections including a central section, and two spaced side sections. The sections are interconnected to metal cleats which also act as drive cleats which provide positive traction with the ground for propelling the snowmobile in a forward direction in response to movement of the drive belt.

Another type of drive belt assembly, particularly useful for snowmobiles, is shown in Maki U.S. Pat. No. 3,930,689 wherein partial or two-thirds cleats are used in cooperative relationship with flexible lugs or projections on the outer surface of the drive belt in order to provide not only positive forward traction but to also substantially avoid side slippage of the rear of the snowmobile.

One reason why snowmobile drive belts are constructed with three spaced endless sections is that the bottom surface of both slide rails of a suspension system are positioned in the spaces between the central drive belt section and each of the outer drive belt sections and the bottom surfaces of the slide rail bear against the inner surface of each of the cleats. Generally, the slide rail is constructed of a rigid plastic material, such as molded nylon, while the cleats are constructed of a metal to thereby provide for low frictional resistance between the slide rail and the surfaces of the cleats.

Still another type of track or drive belt assembly for snowmobiles is unitarily formed, that is, the central track section is interconnected to a pair of side track sections by substantially unitary interconnecting portions, which are preferably reinforced, as with a reinforcing rod, for example, so as to securely mount the two side track sections to the central section. In such a unitarily formed drive belt or track assembly, metal drive cleats are not used and it is, therefore, additionally necessary to secure a plurality of track guide clips to the unitary members that interconnect the central drive belt section to the side belt sections. In the prior art, such track guide clips have generally comprised a metallic member that is secured rigidly to the interconnecting members and that an offset portion of the clip is located on the outside of the central drive belt section so as to form lateral guides adjacent the outer sides of the slide rails so as to substantially avoid the slide rails from becoming disengaged from the drive belt. With the prior art track guide clips, however, they unduly frequently became broken, resulting in a relatively high incidence of maintenance in order to replace the broken clips.

SUMMARY OF THE INVENTION

It is, therefore, an important object of this invention to provide an improved drive belt assembly, particularly for use in connection with snowmobiles utilizing a slide rail suspension system, wherein the drive track assembly includes improved members for guiding the drive belt assembly relative to the slide rail.

It is also an object of the present invention to provide an improved unitarily formed drive belt assembly for snowmobiles, utilizing a slide rail suspension system wherein the drive belt is of unitary construction and includes improved track guide clips.

It is a further object of the present invention to provide an improved unitarily formed drive belt assembly for snowmobiles which includes improved structure for supporting the track guide clips used in connection with the slide rail for guiding the movement of the drive belt relative to the slide rails, wherein the track guide clips are supported by unitarily formed lug members located on the drive belt assembly.

It is yet another object of the present invention to provide an improved unitarily formed drive belt assembly for snowmobiles wherein the drive belt assembly is unitarily formed and utilizes track guide clips, wherein there is an improvement in the construction thereof for substantially reducing breakage and thereby repair of the drive belt assembly.

It is still a further object of the present invention to provide an improved snowmobile drive belt assembly of the type which is unitarily formed and which utilizes track guide clips for use in guiding the drive belt relative to a slide rail suspension system wherein the design is characterized by its simplicity and economy of construction and manufacture.

Further purposes and objects of the present invention will appear as the specification proceeds.

The foregoing objects are accomplished by providing an improved drive belt assembly, particularly for use with snowmobiles, wherein the assembly includes a unitarily formed flexible drive belt having an inner side and an outer ground engaging side, the flexible drive belt or track having a central, continuous section and a pair of laterally spaced continuous side sections, a plurality of longitudinally spaced portions for unitarily interconnecting each of the side sections with the drive belt section, a plurality of unitary lugs projecting from the inner surface or side of each of the side belt sections and central belt section, selected lugs being proximate the interconnecting members, a plurality of rigid members, each having a first section affixed to said interconnecting members and having a second section which is in supportive and cooperative relationship with the selected lug members provided on the central or side sections of the drive belt assembly.

BRIEF DESCRIPTION OF THE DRAWING

One particular embodiment of the present invention is illustrated in the accompanying drawings, wherein:

FIG. 3 is an exploded, pictorial view illustrating a portion of the drive belt assembly of the embodiment of FIGS. 1 and 2, shown in combination with a slide rail of a slide rail suspension system;

FIG. 4 is an enlarged, fragmentary sectional view taken along the line 4—4 of FIG. 3;

FIG. 5 is a pictorial view of one improved track guide clip which is mounted on a portion of the drive belt assembly of FIGS. 1-3; and FIG. 6 is a fragmentary, sectional view taken along the line 6—6 of FIG. 4.

DETAILED DESCRIPTION OF THE PREFERRED EMBODIMENT

Figure 1:
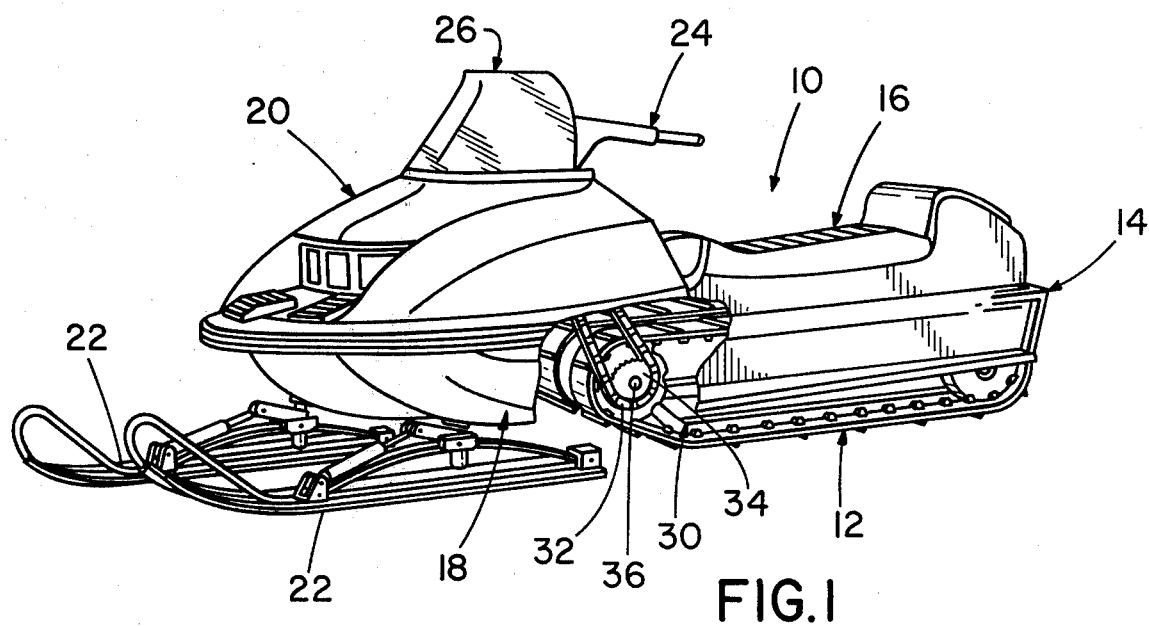
FIG. 1 is a perspective view of a snowmobile utilizing an improved drive belt assembly made in accordance with the present invention.

Referring to FIG. 1, there is shown a snowmobile, generally 10, which uses my improved drive belt or track assembly, generally 12. The snowmobile 10 is of generally conventional construction and includes an elongated tunnel or frame, generally 14, which includes a seat assembly, generally 16, which is located at the top rear portion thereof. A belly pan, generally 18, is conventionally secured to the tunnel 14 at the forward, lower portion of the snowmobile 10. A hood 20, is mounted on and over the belly pan 18. A pair of steerable, front, shock mounted skis, generally 22, are mounted at the forward end of the snowmobile 10, generally below and forwardly of the belly pan 18. The skis 22 are steered by a handle bar assembly, generally 24. A windshield 26 is secured to the hood 20 in front of the handle bar assembly 24.

The drive belt assembly, made in accordance with my invention, is supported on the snowmobile 10 by a slide rail suspension system, generally 30, which may be of the type shown, for example, in Swenson et al U.S. Pat. No. 3,458,312. A drive chain 32 is driven by a drive clutch assembly (not shown) which is mounted below the hood 20 and which is operated by an internal combustion engine (not shown), also mounted under the hood. The drive chain 32 engages a sprocket 34 which rotates a drive shaft 36. Additional sprockets (not shown) are securely mounted on the drive shaft 36 and, in a conventional manner, drivably engage the inner driving side of the drive belt assembly 12 in order to drive the belt 12 and thereby propel the snowmobile 10 in a forward direction.

The foregoing description of the snowmobile 10 is intended to provide a general description of the basic construction of the snowmobile 10 and, except for the construction of the drive belt 12, the snowmobile 10, as shown and described herein, is of generally conventional construction.

Figure 2:
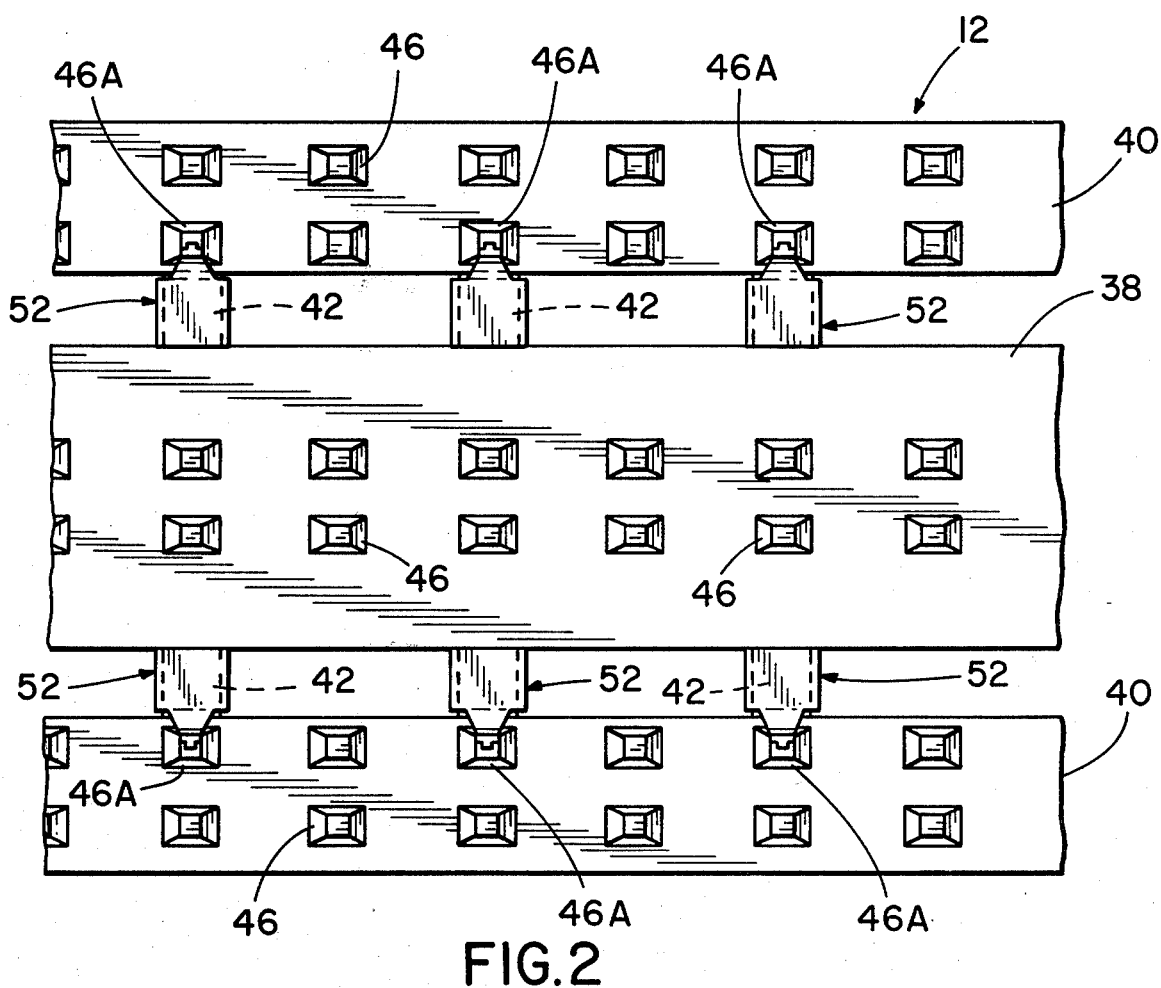
FIG. 2 is a plan view of the inner side of the drive belt assembly utilizing the drive belt assembly embodied in FIG. 1.

With reference to FIG. 2, there is shown a plan view of a section of the continuous track or drive belt 12. FIG. 3 illustrates, in pictorial view, the relationship between the slide rail suspension system 30 and the drive belt 12. The drive belt 12 includes a central continuous or endless belt section 38 and a pair of continuous or endless side belt sections 40 both of which are laterally spaced from the longitudinal edges of the central belt section 38. The central belt section 38 and the side belt sections 40 are substantially parallel with each other and are of substantially the same length with the central belt section 38 being approximately the same width as the combined width of the side belts 40.

As seen best in the cross-sectional view of FIG. 6, the central belt section 38 and side belt sections 40 are unitarily interconnected by connector portions 42. The connector portions 42 are unitarily formed with the central belt section 38 and side belt sections 40. Preferably, a rigid reinforcing rod 44, as seen in FIG. 6, is embedded in the central portion of each of the connector portions 42 in order to assure secure interconnection between the side belt sections 40 and the central belt section 38. The belt sections 38 and 40 and the connectors 42 may be constructed or manufactured by using conventional techniques, such as by the use of conventional vulcanization equipment. In the construction of the belt sections 38 and 40, themselves, a plurality of layers of an elastomeric material and textile fabrics may be built up, by the use of established procedures, to a desired dimension and then placed in a mold for forming the outer surfaces of the belt to the desired shape and dimensions.

Referring particularly to FIGS. 2 and 3, the driving side or surface of the central belt section 38 and side belt sections 40 includes three sets of spaced drive lugs or projections 46. The drive lugs 46 are aligned and are uniformly spaced from each other longitudinally of the belt sections 38 and 40. One set of aligned driving lugs 46 are provided on each of the side belt sections 40 and the central belt section 38 includes another set of driving lugs 46. Drive sprockets (not shown) are non-rotatably mounted on the drive shaft 36 of the snowmobile, as seen in FIG. 1, and include driving teeth (not shown) which engage the driving lugs 46. It is important that certain selected driving lugs 46A are to be in close proximity or adjacent to the unitary connectors 42 on the inner edges of the two belt side sections 40, as seen best in FIGS. 2 and 3. The driving lugs 46 are preferably and conventionally unitarily formed or molded with the belt sections 38 and 40. The outer surface or ground engaging side 48 of the belt sections 38 and 40 also includes ground engaging lugs 50 which provide for positive traction between the drive belt sections 38 and 40 and the ground for propelling the snowmobile 10 forwardly.

The drive belt 12 further includes a plurality of metallic track guide clips, generally 52, which are shown in pictorial view in FIG. 5, prior to assembly to the drive belt 12. Referring to FIG. 5, each of the guide clips 52 includes a connector section 54 and an upright, L-shaped guide section 56. The connector section 54 includes an upper slide rail engaging portion 58, a pair of downwardly turned side walls 60, and a pair of lower and inwardly turned wings 62. As seen best in FIG. 6, the upper portion 58 of each clip 52 is placed against the upper surface of each of the connector sections 54, the side portions 60 are placed against the opposite sides of each of the connectors 42 and the wings 62 are placed around and below the lower surface of each connector section 42.

In the assembled position as seen best in FIGS. 3 and 4, the guide section 56 is in supportive and cooperative relationship with the lugs 46A. The guide section 56 includes an upright side wall 64 which is offset from the connector section 54 of the clip 52 and is positioned adjacent to or in close proximity to the inner surface of each of the cooperating connector lugs 46A. The guide section 56 further includes an upper section 66 which is constructed and arranged to bear against the upper surface of each of the lugs 46A.

With reference to FIG. 4, the cooperative relationship between the guide clips 52 and the drive belt 12 relative to the slide rail 30 is illustrated. First, the upper wall 58 of the connector section 54 of each of the track guide clips 52 presents a smooth rigid wall against which the lower surface of the slide rail assembly 30 bears. The slide rail 30 is constructed of an extruded aluminum support 68 having a low friction wear strip 70 securely mounted thereon. Since the clips 52 are preferably constructed of a metal, there is a relatively minimal frictional force between the wear strip 70 and the clips 52. The clips 52 rigidify the connector sections 42 interconnecting the central belt section 38 and the side belt sections 40 and the guide section 56 cooperates with each of the connector lugs 46A to substantially avoid relative lateral movement of the slide rails 30 and the belt 12 relative to each other. Because the guide sections 56 are not only protected but supported by the lugs 46A, the breakage of the clips 52 during use is maintained at minimum levels.

While in the foregoing there has been provided a detailed description of a particular embodiment of the present invention, it is to be understood that all equivalents obvious to those having skill in the art are to be included within the scope of the invention, as claimed.

What is claimed is:

1. A drive belt assembly for a snowmobile, said snowmobile being of the type which includes a frame and a frame and a slide rail for operatively suspending said drive belt assembly relative to said snowmobile frame, said drive belt assembly comprising, in combination, a flexible drive belt having an inner side and an outer ground engaging side, said slide rail operatively bearing against said inner side of said drive belt, said flexible drive belt having a central continuous section and a pair of laterally spaced continuous side sections, a plurality of longitudinally spaced elongated portions for connecting each of said side sections with said central section, a plurality of unitary lug members projecting from said inner side of said belt sections and being substantially proximate to said connecting portions and a plurality of formed rigid metallic members, each said rigid member having a first section fixed to one of said connecting portions in a substantially surrounding relationship thereto and having an offset section, each offset section having a side section and a top section, said top section and said side section being substantially adjacent one lug member, said offset section and said one lug member thereby defining means for protecting and supporting said rigid metallic members for substantially avoiding breakage during use, said first sections slidably bearing against said slide rail for providing relatively low frictional resistance between said slide rail and said belt, each said first section further defining means for rigidifying each said connecting portion, and each of said offset sections and each of said lug members further cooperating to define means for laterally guiding said slide rail relative to said drive belt.

2. The drive belt assembly of claim 1 wherein said rigid members are formed metallic members affixed to each of said portions adjacent each of said selected unitary lug members, each of said selected lug members being positioned on said continuous side sections.

* * * * *